United States Patent [19]

Inoue

[11] Patent Number: 4,462,641
[45] Date of Patent: Jul. 31, 1984

[54] DECELERATION SENSING VALVE ASSEMBLY FOR VEHICLE BRAKE

[75] Inventor: Hidefumi Inoue, Omiya, Japan

[73] Assignee: Jidosha Kiki Co., Ltd., Tokyo, Japan

[21] Appl. No.: 495,305

[22] Filed: May 16, 1983

Related U.S. Application Data

[62] Division of Ser. No. 234,122, Feb. 13, 1981, Pat. No. 4,397,506.

[30] Foreign Application Priority Data

Feb. 13, 1980 [JP] Japan ................................. 55/16210

[51] Int. Cl.³ ............................................. B60T 8/14
[52] U.S. Cl. ................................. 303/24 C; 188/349; 303/6 C; 303/24 F
[58] Field of Search ................. 303/24 A, 24 R, 24 F, 303/24 C, 24 BB, 6 C, 6 R, 84 A, 84 R, 22 R, 22 A, 23 R, 23 A; 188/349, 195; 137/38, 39, 45, 46

[56] References Cited

U.S. PATENT DOCUMENTS 3,163,473 12/1964 Stelzer ........................ 303/24 F X
4,397,506 8/1983 Inoue .......................... 303/24 F X Primary Examiner—Douglas C. Butler
Attorney, Agent, or Firm—Flynn, Thiel, Boutell & Tanis

[57] ABSTRACT

A deceleration sensing valve is provided which includes a valve body adapted to move under its own inertia as the deceleration of a road vehicle exceeds a given value, and a valve seat on which the valve body seats. The valve seat is located rearwardly of the valve body as viewed in the direction of movement thereof under its inertia, whereby there can occur no change in a control pressure derived by the deceleration sensing valve, in particular when the vehicle is empty, as it does occur in the prior art in response to any slight shift in the timing when the valve body becomes seated. Consequently, when used in combination with a proportion valve, the deceleration sensing valve of the invention assures a stable braking characteristic when the vehicle is empty as well as when the vehicle is occupied.

17 Claims, 7 Drawing Figures

DIRECTION OF RUNNING OF VEHICLE

DECELERATION SENSING VALVE ASSEMBLY FOR VEHICLE BRAKE

This is a division, of application Ser. No. 234,122, filed Feb. 13, 1981, now U.S. Pat. No. 4,397,506.

BACKGROUND OF THE INVENTION

The invention relates to a deceleration sensing valve assembly which operates by sensing the deceleration of a vehicle, and more particularly, to a deceleration sensing valve assembly including a valve body which is adapted to move away from its valve seat under its own inertia whenever the deceleration of the vehicle exceeds a given value.

In conventional deceleration sensing valves, a valve seat is located forwardly of a valve body, as viewed in the direction of movement of the valve body under its inertia. When a given deceleration is obtained by a low liquid brake pressure as when the vehicle is empty, the valve body is caused to move into seating on the valve seat under its inertia, thereby interrupting a flow path to maintain the liquid brake pressure which is introduced to a point downstream of the deceleration sensing valve at a low value. On the other hand, when a given deceleration is not obtained if the liquid brake pressure increases to a high value as when the vehicle is occupied, the valve body is located remote from the valve seat under gravity, permitting the high liquid brake pressure to be introduced into the flow path downstream of the deceleration sensing valve. A deceleration sensing valve of the kind described is used in combination with a proportioning valve which increases the liquid brake pressure introduced into a rear wheel cylinder at a low increase rate relative to the liquid brake pressure introduced into a front wheel cylinder, and normally controls the magnitude of a bias applied to the proportioning valve in accordance with the magnitude of the liquid brake pressure introduced into the flow path downstream of the deceleration sensing valve, in a manner such that the bias is maintained low to enable the proportioning valve to be responsive to a low liquid brake pressure when the vehicle is empty while the bias is increased to enable the proportioning valve to be operable only after a high liquid brake pressure is obtained when the vehicle is occupied, thus assuring braking characteristics which are suitable when the vehicle is empty and loaded, respectively.

However, because of the location of the valve seat forwardly of the valve body as viewed in the direction of movement thereof under inertia and the arrangement that the valve body moves under inertia until its seats on the valve seat, conventional deceleration sensing valves suffer from a disadvantage that in particular when the vehicle is empty, extraneous factor such as oscillations of the vehicle may cause a shift in the timing when the valve body becomes seated. This in turn causes a variation in the liquid brake pressure which is confined in the flow path downstream of the deceleration sensing valve, thus making the empty vehicle characteristic unstable.

SUMMARY OF THE INVENTION

It is an object of the invention to provide a deceleration sensing valve assembly which is capable of stabilizing an empty vehicle braking characteristic. This object is achieved by locating a valve seat rearwardly a valve body so that the valve body moves away from the valve seat under its own inertia whenever the deceleration of a vehicle exceeds a given value.

Other objects and advantages of the invention will become apparent from the following description with reference to the drawings.

DESCRIPTION OF EMBODIMENTS

Figure 1:
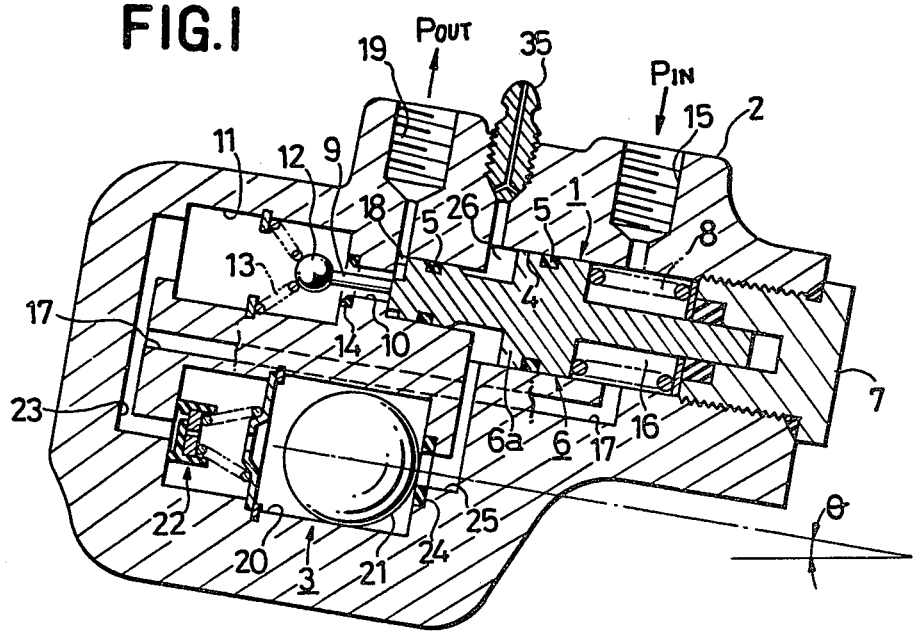
FIG. 1 is a longitudinal section of a deceleration sensing valve according to one embodiment of the invention which is combined with a proportioning valve.

Referring to FIG. 1, there is shown a control valve assembly having a proportioning valve 1 disposed in a casing 2, in which a deceleration sensing valve 3 according to the invention is also disposed. The casing 2 is formed with a bore 4 in which a plunger 6 of the proportioning valve 1 is slidably fitted in liquid tight manner by means of a seal member 5. The plunger 6 is urged to the left by a spring 8 which is interposed between the right-hand end face of a portion 6a of the plunger having an increased diameter which is formed intermediate its ends and the left-hand end face of a plug 7 which blocks the righthand opening of the bore 4. The left-hand end of the plunger 6 is provided with a rod 9, which loosely extends through an opening 10 into a chamber 11 whenever the plunger 6 is urged to the left by the spring 8 to assume its non-operative position shown in FIG. 1, the opening 10 communicating with the bore 4. Received with the chamber 11 is a valve body 12 which is adapted to be subject to a thrust from the rod 9 and which is urged by a spring 13 in a direction to seat on a valve seat 14 which is formed around the opening 10. However, it is to be noted that the resilience of the spring 8 is greater than that of the spring 13, so that the plunger 6 is normally maintained in its non-operative position shown, with the valve body 12 being held apart from the valve seat 14 by means of the rod 9.

The casing 2 is formed with an input port 15 which is connected to a master cylinder, not shown, and which also communicates with a chamber 16 in which the spring 8 is received. The chamber 16 communicates with the chamber 11 which contains the valve body 12 through a passage 17 which is formed to extend through the casing 2. The casing is also formed with an output port 19 which is connected to a rear wheel cylinder, not shown. The chamber 16 also communicates with the output port 19 through the opening 10 and through a passage 18 which is defined around the step between the plunger 6 and the rod 9.

The deceleration sensing valve 3 includes a chamber 20 and a ball-shaped valve body 21 which is received therein in a freely rollable manner. It is to be noted that by mounting the casing 2 on the vehicle chassis, not shown, with an angle of inclination, $\theta$, the valve body 21 normally assumes its downmost position within the chamber 20. The uppermost portion of the chamber 20 which contains the valve body 21 communicates with the chamber 11 containing the valve body 12 of the proportioning valve 1 through a valve mechanism 22 and passages 23, 17. On the other hand, the downmost portion of the chamber 20 communicates with a chamber 26 which is formed in the left end portion of the plunger portion 6a having an increased diameter, through a valve seat 24 on which the valve body 21 seats by gravity and through another passage 25.

Figure 2:
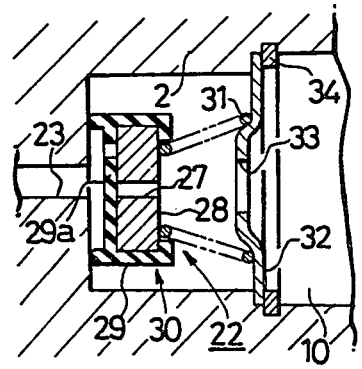
FIG. 2 is a fragmentary enlarged view of FIG. 1.

As shown in exaggerated form in FIG. 2, the valve mechanism 22 includes a disc-shaped member 28 which is centrally formed with a through-opening 27 in substantial alignment with the axis thereof, and an elastic member 29 formed of a material such as rubber and which is disposed to surround the periphery of the member 28 and having a flexible portion 29a located adjacent to the passage 23 and adapted to block the through-opening 27 under its own resilience. The combination of the disc-shaped member 28 and the elastic member 29 contitutes together a valve body 30. The valve body 30 is biased in one direction by a spring 31 so as to close normally the passage 23. Accordingly, the valve mechanism 22 becomes open whenever a liquid brake pressure prevailing within the chamber 11 exceeds a given value to allow the brake pressure to be introduced into the chamber 20. Subsequently, when the brake pressure within the chamber 11 decreases, the hydraulic fluid introduced into the chamber 20 is displaced toward the chamber 11 through the opening 27 and a clearance formed between the disc-shaped member 28 and the flexible portion 29a which is then flexed under the pressure thereof.

Figure 3:
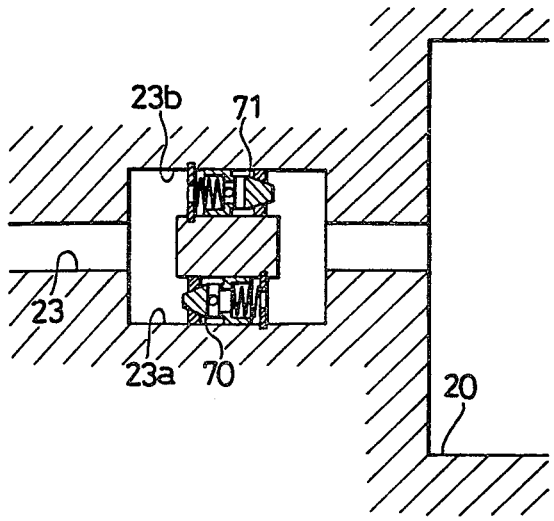
FIG. 3 is a longitudinal section of a valve mechanism according to another embodiment.

As illustrated in FIG. 3, a valve mechanism having the same function can be formed by providing a pair of parallel branch paths 23a, 23b in the passage 23, with a check valve 70 or 71 disposed in each branch path to permit a flow in the opposite direction from the other. It will be understood that the check valve 71 corresponds to the flexible portion 29a mentioned above.

A reference numeral 32 shown in FIG. 2 represents a retainer functioning as an ambient for the spring 31, numeral 33 an opening formed in a shank portion of the retainer, and numeral 34 a stop ring which supports the retainer. In FIG. 1, reference numeral 35 represents an air vent valve.

In operation, when a brake pedal, not shown, is depressed to produce a liquid brake pressure within the master cylinder, the brake pressure is transmitted through the input port 15 to the output port 19 through a path including the chamber 16, passage 17, chamber 11, opening 10 and passage 18, allowing the pressure to be introduced into the rear wheel cylinder. During an initial phase of a braking operation when the liquid brake pressure is low, the plunger 6 of the proportioning valve 1 is not operated, so that a liquid brake pressure which is substantially equal to the liquid brake pressure introduced into the front wheel cylinder which is connected to the master cylinder, namely an input liquid brake pressure $P_{IN}$, is introduced into the rear wheel cylinder, as indicated by a rectilinear curve A in FIG. 4.

Figure 4:
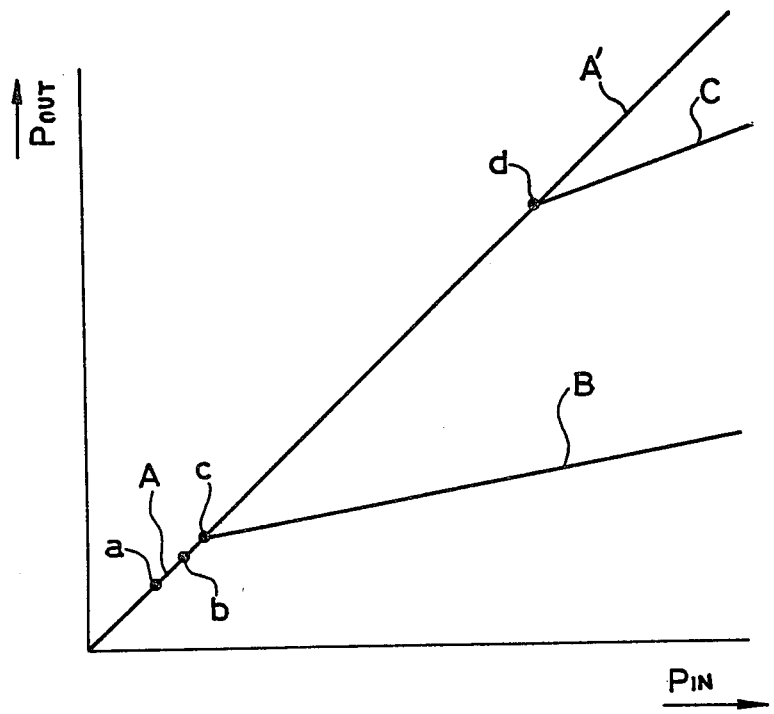
FIG. 4 graphically illustrates the braking characteristic.

When the vehicle is empty, a liquid brake pressure of a relatively low magnitude is sufficient to cause the deceleration of the vehicle to exceed the given value, as indicated at point a in FIG. 4, whereby the ball-shaped valve body 21 rolls to the left, as viewed in FIG. 1, under its own inertia to move away from the valve seat 24. When the liquid brake pressure increases under such condition to a value indicated by point b in FIG. 4, the hydraulic fluid forces the valve body 30 of the valve mechanism 22 to open to permit a fluid flow into the chamber 20 through the passages 17, 23 and thence into the chamber 26 through the clearance formed between the valve body 21 and the valve seat 24 and through the passage 25. As mentioned previously, since part of the chamber 26 is formed in the left-hand end of the plunger portion 6a having an increased diameter, the brake pressure introduced into this chamber urges the plunger to the right against the resilience of the spring 8.

As the liquid brake pressure further increases to a value indicated by a point c in FIG. 4, the bias applied to the plunger 6 to urge it to the right, or the bias applied by the liquid brake pressure introduced into the chamber 26, combined with the bias applied by the liquid brake pressure which acts upon the left-hand end face of the plunger 6, exceeds the sum of the resilience of the spring 8 and the bias applied to the plunger 6 to urge it to the left by the liquid brake pressure introduced into the chamber 16, whereby the plunger 6 moves to the right, allowing the valve body 12 to seat on the valve seat 14. Thereupon, a further increase in the liquid brake pressure which is introduced into the rear wheel cylinder through the opening 10 is prevented.

Subsequently, as the liquid brake pressure further increases, the bias applied to the left-hand end face of the plunger 6 does not increase since the valve body 12 seats on the valve seat 14 while the biases applied by the liquid brake pressure introduced into the chambers 16, 26 continues to increase. Since the surface area of the plunger 6 which is subject to the hydraulic pressure prevailing in the chamber 16 is chosen to be greater than the surface area of the plunger which is subject to the hydraulic pressure prevailing in the chamber 26, the plunger 6 then moves to the left, thus moving the valve body 12 away from the valve seat 14. As a result, the liquid brake pressure acting on the left-hand end face of the plunger 6 and hence supplied to the rear wheel cylinder increases to cause a movement of the plunger 6 to the right, thus causing the valve body 12 to again be seated on the valve seat 14. In this manner, the plunger 6 reciprocates to the left and right as the liquid brake pressure continues to increase, causing the liquid brake pressure $P_{OUT}$ supplied to the rear wheel cylinder to be increased with respect to the input brake pressure $P_{IN}$ at a low increase rate which depends on the difference of the surface areas subject to the respective hydraulic fluids (see recilinear curve portion B shown in FIG. 4).

In contrast to the braking characteristic of the vehicle when it is empty, when the vehicle is loaded, the deceleration of the vehicle remains at a small value as the liquid brake pressure increases to a value which is sufficient to force the valve body 30 of the mechanism 22 open (see point b in FIG. 4). Hence the valve body 21 is maintained in engagement with the valve seat 24 by gravity. When the valve body 30 is forced open under this condition to permit flow of the fluid brake pressure into the chamber 20, the hydraulic fluid maintains the valve body 21 against the valve seat 24 as a result of a pressure differential between the pressure prevailing in the chamber 20 and the pressure prevailing in the passage 25 and the chamber 26. Consequently, the valve body 21 cannot be moved away from the valve seat 24 even if the liquid brake pressure further increases and causes the deceleration of the vehicle to exceed the given value. Since no liquid brake pressure is introduced into the chamber 26 on the left-hand side of the plunger portion 6a under this condition, the only bias applied to the plunger 6 to cause it to move to the right is obtained by the liquid brake pressure applied to the left-hand end face of the plunger 6. Consequently, the plunger 6 cannot move to the right if the liquid brake pressure increases to point c, in contradistinction to the operation when the vehicle is empty. In this instance, operation of the plunger 6 is avoided if the surface area on the right-hand end of the plunger portion 6a which communicates with the chamber 16 is greater than that on the left-hand end of the plunger 6. Hence, liquid brake pressure which is substantially equal to that produced within the master cylinder can be introduced into the rear wheel cylinder (see rectilinear curve A' shown in FIG. 4). On the other hand, if the relationship of the surface areas mentioned above is designed to be opposite from that mentioned above, the operation of the proportioning valve 1 can be initiated at a liquid brake pressure (see point d shown in FIG. 4) which is greater than the corresponding value effective when the vehicle is empty, by an amount which depends on the magnitude of the difference in the surface areas (see rectilinear curve C shown in FIG. 4). In either instance, a braking characteristic can be obtained which is appropriate when the vehicle is loaded.

Figure 5:
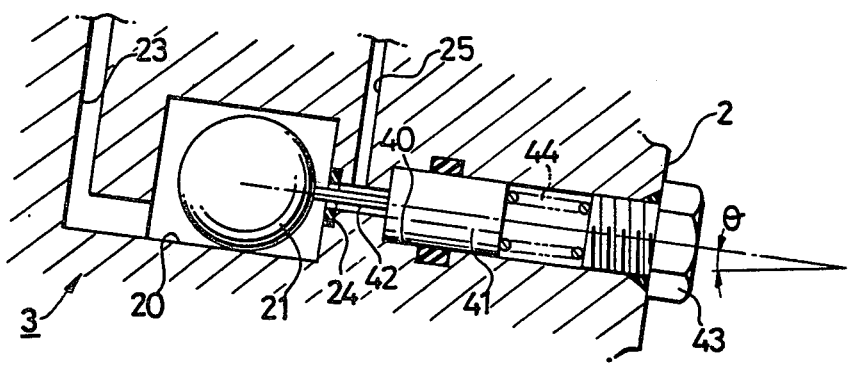
FIG. 5 is a longitudinal section of a deceleration sensing valve according to a further embodiment of the invention.

FIG. 5 shows a liquid pressure sensing valve according to another embodiment of the invention. In this embodiment, the valve mechanism 22 mentioned above is omitted, and instead a piston 41 is slidably fitted in a bore 40 which communicates with the passage 25, with a rod 42 mounted on the piston 41 to thrust the valve body 21 mentioned above. In addition, a spring 44 is interposed between the piston 41 and a plug 43 which blocks the bore so that the valve body 21 is normally prevented from seating on the valve seat 24 by the presence of the rod 42. In other respects, the arrangement is similar to that shown in FIG. 1.

In this embodiment, the liquid brake pressure is immediately introduced into the chamber 20, passage 25 and the chamber 26 through the passage 23 as soon as it is produced, and the pressure acts on the left-hand end face of the piston 41, tending to move it to the right. Consequently, a pressure of a given value must be obtained before the piston 41 moves to the right, and thus when the vehicle is empty and is decelerated the valve body 21 rolls to the left under its inertia before this given valve is reached so that a subsequent movement of the piston 41 to the right still will not allow the valve body 21 to seat on the valve seat 24, thus allowing a similar braking characteristic to be obtained as mentioned in connection with the previous embodiment when the vehicle is empty.

By contrast, when the vehicle is loaded, the liquid brake pressure of this given value causes the piston 41 to move to the right to allow the valve body 21 to be seated on the valve seat 24 before the valve body 21 has a tendency to roll to the left under its inertia caused by the deceleration of the loaded vehicle, and the subsequent increase in the liquid brake pressure caused by the deceleration of the loaded vehicle maintains the valve body 21 seated on the valve seat 24, thus allowing the desired braking characteristic to be obtained as in the previous embodiment when the vehicle is loaded.

It will be seen from the above description of the two embodiments that the controlled pressure which is produced in the passage 25 downstream of the deceleration sensing valve 3 of the invention is high and low when the vehicle is empty and loaded, resectively, in a manner opposite to that of the conventional deceleration sensing valve initially mentioned. Thus, the manner of utilizing the controlled pressure is opposite from that of the prior art, but a variety of proportioning valves which are suitable for use with the invention can be easily constructed.

Figure 6:
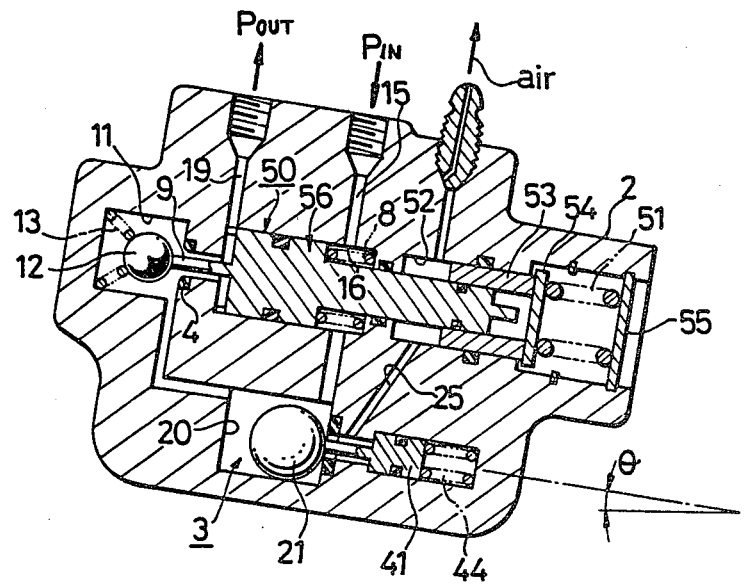
FIGS. 6 and 7 are longitudinal sections of the deceleration sensing valve shown in FIG. 5 combined with proportioning valves of different forms.

FIG. 6 shows proportioning valve 50 in accordance with an additional embodiment which is provided with a second spring 51 so that the resilience of the second spring does not act on the proportioning valve when the vehicle is empty, but acts when the vehicle is loaded, thus allowing different braking characteristics to be obtained when the vehicle is empty and loaded. Specifically, the proportioning valve 50 is constructed essentially in the same manner as the conventional proportioning valve so that it becomes operative whenever the liquid brake pressure exceeds a given value to reduce the rate of increase of the liquid brake pressure to a given value. In FIG. 6, the proportioning valve 50 includes a chamber 52 in which a controlled liquid brake pressure from the deceleration sensing valve 3 is introduced. One end of a piston 53 is disposed in the chamber 52, and the second spring 51 is interposed between a plate 54 fixedly mounted on the other end of the piston 53 and a retainer 55 which is disposed in the casing 2. The plate 54 is located opposite to one end of a plunger 56 which is slidably fitted into a bore formed in the piston 53 to constitute the proportioning valve 50. In other respects, the arrangement is similar to that shown in FIG. 1 except that a deceleration sensing valve shown in FIG. 5 is used and that a communication is maintained between the chambers 16, 11 through the chamber 20 of the deceleration sensing valve, and accordingly corresponding parts are designated by like reference numerals.

In operation, when the vehicle is empty, as a liquid brake pressure of a high magnitude is introduced into the chamber 52, both the piston 53 and the plate 54 move to the right, with the plate 54 located out of interference with the plunger 56. As a consequence, only the resilience of the spring 8 acts on the plunger 56, allowing the proportioning valve 50 to initiate its operation at a low brake pressure. On the other hand, when the vehicle is loaded, a liquid brake pressure of a high magnitude is not introduced into the chamber 52, so that both the piston 53 and the plate 54 remain in their nonoperative positions shown. The proportioning valve 50 tends to initiate its operation at a low brake pressure in a similar manner as when the vehicle is empty, but the right-hand end of the plunger 56 moves into abutment against the plate 54 before the plunger 56 can move an enough stroke to the right to permit the valve body 12 to be seated on the valve seat 14, with the resilience of the second spring 51 acting on the plunger 56. Consequently, the proportioning valve 50 cannot operate at the described low brake pressure, but initiates its operation only when a higher liquid pressure is obtained. Alternatively, the operation of the proportioning valve 50 can be entirely prevented by using a stronger spring for the second spring 51. Accordingly, it will be apparent that the braking characteristic as illustrated in FIG. 4 can be achieved with this form of proportioning valve.

Figure 7:
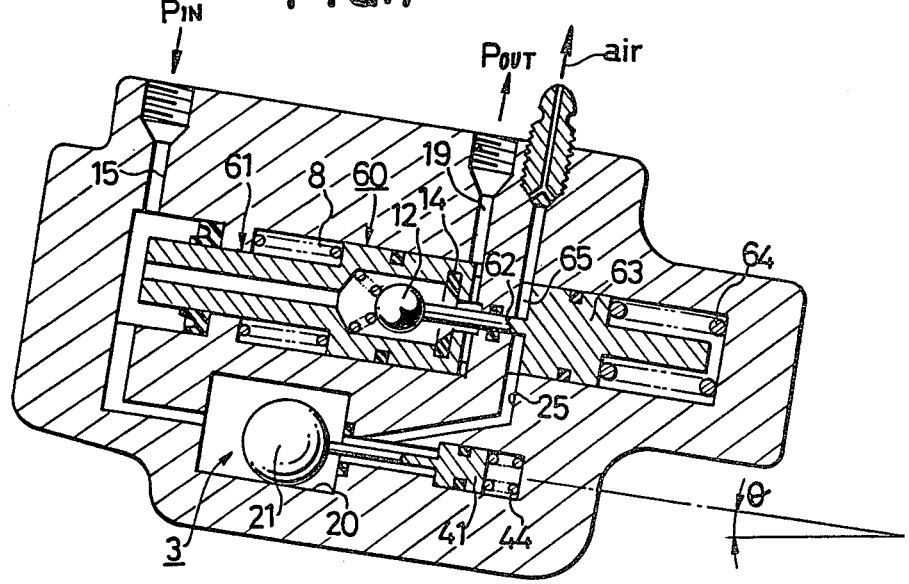

FIG. 7 shows another embodiment of proportion valve 60 in which the lift of the valve body 12 can be adjusted to attain the different braking characteristics when the vehicle is empty and loaded. Specifically, the proportioning valve 60 shown houses the valve body 12 within a plunger 61 as a deviation from that mentioned previously. However, a proportioning valve of such construction is also known in the art. In the conventional proportion valve, a rod 62 which is used to thrust the valve body 12 is fixedly mounted on the casing 2, but in accordance with the invention, the rod 62 is connected to a piston 63 for movement therewith. The piston 63 is urged by a spring 64 in one direction so that the degree of extension of the rod 62 or the lift of the valve body 12 from the valve seat 14 is normally at its maximum. The passage 25 downstream of the deceleration sensing valve 3 is connected in communication with a chamber 65 formed in the left-hand end face of the piston 63. In other respects, the arrangement is similar to that shown in FIG. 1, and corresponding parts are designated by like reference numerals.

With this form of proportioning valve, as a liquid pressure of an increased magnitude is introduced into the chamber 65 when the vehicle is empty, the piston 63 and the rod 62 move to the right to decrease the lift of the valve body 12 while when the vehicle is loaded, the lift of the valve body 12 is maintained at its initial value since the rod 62 does not move to the right. Accordingly, the magnitude of the liquid pressure which is required to move the plunger 61 against the resilience of the spring 68 until the valve body 12 becomes seated on the valve seat 14 is greater when the vehicle is loaded, resulting in the braking characteristics as indicated by rectilinear curves B and C in FIG. 4 to be obtained.

While the invention has been shown and described herein with reference to specific embodiments thereof, it should be understood that the invention is not limited thereto, but a number of modifications, changes and variations can be made therein without departing from the spirit and scope of the invention. Accordingly, it is intended that the invention be limited solely by the appended claims.

What is claimed is:

1. A deceleration sensing valve assembly for regulating brake fluid pressure in a vehicle movable in a forward direction, comprising:

housing means defining therein a chamber;

an inlet passage opening into said chamber for permitting fluid to be supplied thereto;

an outlet passage which opens into a rear portion of the chamber for permitting the fluid to flow from the chamber into the outlet passage;

an inertia-actuated valve mechanism for controlling the flow of fluid from the chamber to the outlet passage, said valve mechanism including a valve body movably disposed within said chamber and engageable with a valve seat positioned rearwardly of the valve body relative to the forward direction of the vehicle, said valve seat being disposed in surrounding relationship to the opening of the outlet passage, said valve body being normally gravity-urged toward a position of seating engagement with the valve seat, said valve body tending to move under its own inertia forwardly away from the valve seat in response to vehicle deceleration of a given value as caused by (1) a first predetermined brake fluid pressure when decelerating an empty vehicle and (2) a second predetermined brake fluid pressure when decelerating a loaded vehicle, said second predetermined pressure being greater than said first predetermined pressure; and fluid pressure responsive control means for controlling flow of fluid from said chamber into said outlet passage, said control means including a control member which is movable in response to fluid pressure from a first position wherein said control member maintains said valve body spaced forwardly from and out of engagement with said valve seat into a second position wherein said control member permits said valve body to move under the urging of gravity into engagement with said valve seat, said control member being normally biased into said first position and being moved into said second position in response to imposition of a third predetermined fluid pressure thereon which is greater than said first predetermined pressure but less than said second predetermined pressure;

whereby deceleration of an empty vehicle permits said valve body to move by inertia in a forward direction away from said control member so that the valve mechanism remains open even when the fluid exceeds said third predetermined pressure, whereas when decelerating a loaded vehicle the fluid exceeds said third predetermined pressure and causes the control member to move into its second position so that the valve body seats against the valve seat so as to close off the valve mechanism and the fluid within the chamber then acts against the valve body and assists in holding it against the valve seat even if the fluid exceeds said second predetermined pressure.

2. An assembly according to claim 1, wherein the chamber includes a bottom wall which is sloped upwardly at a small angle relative to the horizontal as it projects forwardly away from the valve seat so that the valve body is normally gravity-urged toward the valve seat, said valve body being movably supported on said sloped bottom wall and capable of moving upwardly therealong away from said valve seat in response to vehicle deceleration of said given value.

3. An assembly according to claim 2, wherein said valve body is in the form of a ball.

4. An assembly according to claim 3, wherein said control member comprises a fluid-actuated piston having a face thereon exposed to said fluid, said piston being normally spring urged into said first position wherein a portion of said piston engages said valve body and maintains it in a forward position spaced from said valve seat, said piston being movable in opposition to said spring into said second position in response to imposition thereon of fluid of said third predetermined pressure for causing said portion of said piston to be retracted so as to not interfere with the free movement of said valve body.

5. An assembly according to claim 4, wherein said piston is slidably supported within a second chamber which is in fluid communication with said first-mentioned chamber by means of an intermediate passage which extends through the valve opening defined by the valve seat, the portion of said piston comprising an elongated rod which extends through the intermediate passage and centrally through the valve opening so as to project into the first-mentioned chamber for engagement with the valve body when the piston is in said first position.

6. In a deceleration sensing valve assembly for regulating the brake pressure fluid of a vehicle movable in a forward direction, said assembly including housing means adapted to be mounted on the vehicle, an inlet passage in said housing means terminating in an inlet port which is adapted to be connected to the brake master cylinder of the vehicle, an outlet passage in said housing means terminating in an outlet port adapted to be connected to one of the vehicle wheel brakes, proportioning valve means movably supported on the housing means for regulating the flow of brake pressure fluid from the inlet passage to the outlet passage, and vehicle deceleration sensing valve means for regulating the flow of brake pressure fluid to said proportioning valve means to control the position thereof, the improvement wherein said deceleration sensing valve means comprises:

control passage means connected between said inlet passage and said proportioning valve means for controlling the flow of brake pressure fluid to the proportioning valve means, said control passage means including a chamber and a control passage providing communication between said chamber and said proportioning valve means, a forwardly facing valve seat associated with said chambrer adjacent the rearward end thereof, said valve seat being disposed in surrounding relationship to said control passage, and an inertia-sensitive valve body movably positioned within said chamber forwardly from said valve seat, said valve body being normally gravity-urged rearwardly toward a position of seating engagement with said valve seat, said valve body when seated on said valve seat preventing flow of fluid from said chamber into said control passage, said valve body being moved forwardly in a direction away from said valve seat due to the inertia thereof in response to the deceleration of said vehicle exceeding a given value before the brake fluid pressure reaches a selected value, whereby the brake fluid is supplied from the chamber through the control passage to the proportioning valve means, and said valve body engaging said valve seat so as to close off the control passage from the chamber if the pressure in the chamber reaches said selected value before the deceleration of the vehicle reaches said given value, whereby the valve body remains seated on the valve seat by gravity and is maintained seated on the valve seat by the pressure within the chamber.

7. An assembly according to claim 6, wherein said chamber includes a bottom wall which is sloped upwardly at a small angle relative to the horizontal as it projects forwardly away from the valve seat, said valve body comprising a ball which is rollingly supported on the sloped bottom wall and is normally gravity-urged toward the valve seat.

8. An assembly according to claim 7, wherein the valve mechanism includes a pistonlike control member associated with said control passage means and movable between a first position wherein a portion of said control member engages said valve body and maintains it spaced forwardly out of engagement with said valve seat and a second position wherein said portion of said control member is retracted out of the path of movement of said valve body to enable it to move by gravity into engagement with said valve seat, said control member being normally biased into said first position and being moved into said second position when the brake pressure fluid in said chamber reaches said selected value.

9. An assembly according to claim 8, wherein said portion of said control member comprises an elongated rodlike element which projects centrally through the valve opening defined by said valve seat into said chamber for engagement with said valve body when the control member is in said first position, said rodlike element being retracted from said chamber when in said second position.

10. An assembly according to claim 7, wherein said valve mechanism includes a normally closed valve associated with an inlet to said chamber for permitting flow of brake fluid into said chamber only when said brake fluid pressure reaches said selected value.

11. A deceleration sensing valve assembly for a vehicle movable in a forward direction, comprising housing means defining therein a chamber, an inlet passage opening into said chamber for permitting fluid to be supplied thereto, an outlet opening into a rear portion of the chamber for permitting the fluid to flow from the chamber into the outlet passage, an inertia-actuated valve mechanism for controlling the flow of fluid from the chamber to the outlet passage, said valve mechanism including a valve body movably disposed within the chamber and engageable with a valve seat positioned rearwardly of the valve body relative to the forward direction of the vehicle, said valve seat being disposed in surrounding relationship to the opening of the outlet passage, said valve body being normally urged toward a position of seating engagement with the valve seat, said valve body being adapted to move under its own inertia in a direction away from the valve seat whenever the deceleration of the vehicle exceeds a predetermined value, and piston means movably supported relative to the housing means and having a portion disposed to extend through the valve seat for movement into and out of the chamber, said piston means when in a non-operative position being disposed with said portion extending into the chamber so as to maintain said valve body out of engagement with said valve seat, and said piston means being movable from said non-operative position into an operative position whenever the fluid pressure introduced into the chamber through the inlet passage exceeds a given value, said piston means when in said operative position being disposed with said portion retracted out of said chamber so as to permit said valve body to move into engagement with said valve seat.

12. A deceleration sensing valve assembly according to claim 11 in which the valve body is in the form of a ball.

13. A deceleration sensing valve assembly according to claim 11, further including a proportioning valve normally urged in one direction to be maintained in its non-operative position and adapted to operate whenever the liquid pressure exceeds the given value to increase the output liquid pressure at a low rate of increase with respect to the increasing input liquid pressure, the proportioning valve including a plunger which is formed with a surface to which a liquid pressure is applied to urge the plunger in a direction opposite to that in which it is normally urged, the liquid pressure from the outlet passage being applied to the surface.

14. A deceleration sensing valve assembly according to claim 11, further including a proportioning valve normally urged in one direction by a first spring to be maintained in its non-operative position and adapted to operate whenever the liquid pressure exceeds a given value to increase the output liquid pressure at a low rate of increase with respect to the input liquid pressure, and a bias transmitting member which is subject to the resilience of a second spring, the liquid pressure from the outlet passage being applied to the bias transmitting member to control it between a first and a second position in which it respectively interferes with and does not interfere with the proportioning valve.

15. A deceleration sensing valve assembly according to claim 11, further including a proportioning valve which houses a valve member for opening or closing a flow path which provides a communication between an input and an output port, the proportioning valve including a rod which thrusts the valve member to move it away from its associated valve seat whenever the proportioning valve is maintained in its non-operative position, the proportioning valve becoming operative whenever the liquid pressure exceeds the given value to increase the output liquid pressure at a low rate of increase with respect to the increasing input liquid pressure by controlling a movement of the valve member, the rod being disposed in a reciprocable manner, and the liquid pressure from the outlet passage being applied to the rod to control its reciprocating movement.

16. A valve assembly according to claim 11, wherein the chamber includes a bottom wall which is sloped upwardly at a small angle relative to the horizontal as it projects forwardly away from the valve seat so that the valve body is normally gravity-urged toward the valve seat, said valve body being rollingly supported on said sloped bottom wall and capable of moving upwardly therealong away from the valve seat in response to vehicle deceleration exceeding said predetermined value.

17. The valve assembly according to claim 16, wherein said piston means is slidably supported within a compartment formed in said housing means and includes a main piston portion which is slidably and sealingly supported within said compartment, said piston means including an elongated rod portion which is fixed to and projects outwardly from said main piston portion through said outlet passage into said chamber when the piston means is in said non-operative position, said rod portion being smaller than the cross section of said outlet passage so that liquid in said chamber can flow past said rod portion for application against an exposed end of said piston portion to effect movement of said piston means into said operative position when the liquid pressure exceeds said given value, and spring means normally urging said piston means into said non-operative position.

* * * * *